(12) United States Patent
Cook

(10) Patent No.: US 12,351,235 B2
(45) Date of Patent: Jul. 8, 2025

(54) VEHICLE ARTICULATING AND CASTER STEERING

(71) Applicant: Stinger Equipment, Inc., LaGrange, KY (US)

(72) Inventor: David Michael Cook, LaGrange, KY (US)

(73) Assignee: STINGER EQUIPMENT, INC., Lagrange, KY (US)

( * ) Notice: Subject to any disclaimer, the term of this patent is extended or adjusted under 35 U.S.C. 154(b) by 778 days.

(21) Appl. No.: 17/500,363

(22) Filed: Oct. 13, 2021

(65) Prior Publication Data

US 2022/0111894 A1      Apr. 14, 2022

Related U.S. Application Data

(60) Provisional application No. 63/091,031, filed on Oct. 13, 2020.

(51) Int. Cl.
| | | |
|---|---|---|
| *B62D 12/00* | (2006.01) | |
| *B60P 1/56* | (2006.01) | |
| *B62D 1/12* | (2006.01) | |
| *B62D 7/16* | (2006.01) | |
| *B62D 51/00* | (2006.01) | |

(52) U.S. Cl.
CPC ............... *B62D 12/00* (2013.01); *B60P 1/56* (2013.01); *B62D 1/12* (2013.01); *B62D 7/16* (2013.01); *B62D 51/001* (2013.01); *B62D 51/008* (2013.01)

(58) Field of Classification Search
CPC . B62D 12/00; B62D 1/12; B62D 7/16; B62D 51/001; B62D 51/008; B62D 9/00; B60P 1/56

See application file for complete search history.

(56) References Cited

U.S. PATENT DOCUMENTS

| | | | | |
|---|---|---|---|---|
| 8,740,229 | B2 * | 6/2014 | Ellsworth | B62D 6/04 |
| | | | | 56/14.7 |
| 8,844,953 | B2 * | 9/2014 | Smyth | B62D 3/12 |
| | | | | 280/93.51 |
| 9,623,903 | B2 | 4/2017 | Cook et al. | |
| 9,725,115 | B1 * | 8/2017 | Hauser | B62D 11/24 |
| 11,046,362 | B1 * | 6/2021 | Snider, Jr. | A01D 34/64 |
| 2014/0298767 | A1 * | 10/2014 | Piontek | B62D 11/08 |
| | | | | 56/14.7 |
| 2024/0226706 | A1 * | 7/2024 | Marabese | A63C 17/016 |

OTHER PUBLICATIONS

U.S. Appl. No. 63/091,031, filed Oct. 13, 2020 titled Vehicle Articulating and Caster Steering.

\* cited by examiner

*Primary Examiner* — Kevin Hurley
*Assistant Examiner* — Marlon A Arce
(74) *Attorney, Agent, or Firm* — Gray Ice Higdon

(57) ABSTRACT

A ground maintenance vehicle that includes: front steering wheels; rear drive wheels; a frame with a first and second pivot point; a single lever steering assembly with a single lever steering control, where the single lever steering assembly is coupled to the first pivot point; multi-axis articulating joint coupled to the second pivot point; a front caster steering assembly coupled to the multi-axis articulating joint; and where the front caster steering assembly and the multi-axis articulating joint simultaneously provide articulating and caster steering proportional to lateral movement from the single lever steering control.

20 Claims, 23 Drawing Sheets

VEHICLE ARTICULATING AND CASTER STEERING

BACKGROUND OF THE INVENTION

Vehicles in the ground maintenance industry traditionally have a dual-hydro, zero turn setup; a front castering steering setup utilizing a steering wheel or single lever (tiller steering) setup; or an articulating frame to control the direction of the vehicle. These methods may be limited in their ability to provide a machine that provides both tight enough turning to satisfy the operator and provide hillside stability.

Zero turn vehicles provide great flexibility for turning, but they may also cause damage to the turf while turning. Even a well-trained operator may do turf damage when making tight turns with the independent drive tires. These zero turn vehicles may also perform poorly on hills. Furthermore, once they start to slide, the machine may become uncontrollable, sliding down a hill where an operator quickly becomes a passenger rather than maintaining control of the vehicle.

Front castering vehicles, like on a lawn tractor. are common. They utilize a steering wheel or lever steering to turn the front tires (caster steering). Caster steering may be effective on hills and general turning, but it is limited in its tight turning ability.

Vehicles may also utilize an articulating steering setup, because it tends to be a simple and cost-effective configuration. Articulating vehicles can provide tight turning, but they lack the precise steering feel of the caster steering and the ease of the zero-turn steering. Additionally, articulating steering generally requires more effort and larger operator inputs to control the vehicle when making repeated tight maneuvers.

Thus, there is a need in the art for vehicle steering that turns tighter minimizing turf damage, that is easier to control, and while also providing hillside stability. The system should turn easily with minimal input and effort from the operator.

The information included in this Background section of the specification, including any references cited herein and any description or discussion thereof, is included for technical reference purposes only and is not to be regarded subject matter by which the scope of the invention is to be bound.

SUMMARY OF THE INVENTION

The present application discloses one or more of the features recited in the appended claims and/or the following features which alone or in any combination, may comprise patentable subject matter.

The object of the invention is to provide a vehicle steering system that utilizes the best of caster steering and articulating steering with a single lever control. The system needs to perform well on hills while being easy to maneuver. The system needs to be intuitive and easy to control with minimal to no operator training or damage to turf when making tight turns.

In an aspect, a ground maintenance vehicle includes: one or more front steering wheels; one or more rear drive wheels; a frame including a first pivot point and a second pivot point; a single lever steering assembly including a single lever steering control, where the single lever steering assembly is coupled to the first pivot point; a multi-axis articulating joint coupled to the second pivot point; a front caster steering assembly coupled to the multi-axis articulating joint; and where the front caster steering assembly and the multi-axis articulating joint simultaneously provide articulating and caster steering proportional to lateral movement from the single lever steering control.

In some embodiments, the ground maintenance vehicle additionally includes a first lever arm and a steering damper coupled with the first lever arm, where the first lever arm and steering damper provide steering feedback to an operator. In some embodiments, the steering damper is adjustable.

In some embodiments, a connecting rod assembly couples the single lever steering assembly and the multi-axis articulating joint. In some such embodiments, the connecting rod assembly is mounted to a second lever arm, and the second lever arm is configured to transmit rotational movement from the single lever steering assembly to the multi-axis steering joint. In other such embodiments, the connecting rod assembly further includes a bumper stop to limit rotation of the front caster steering assembly.

In some embodiments, the ground maintenance vehicle additional includes a transmission cable to transmit movement from the traction control lever to a drive system.

In some embodiments, the single lever steering assembly pivots around a bushing mounted within a pivot tube. In other embodiments, the frame further includes one or more frame mounting arms configure to receive a fertilizer hopper. In still other embodiments, the ground maintenance additionally includes a platform configured to support an operator.

In another aspect, a ground maintenance vehicle includes: one or more front steering wheels; one or more rear drive wheels; a frame including one or more frame mounting arms on a reward section of the ground maintenance vehicle; a multi-axis articulating joint coupled to the frame; a front caster steering assembly coupled to the multi-axis articulating joint, where the front caster steering assembly and the multi-axis articulating joint simultaneously provide articulating and caster steering proportional to lateral movement from a steering control.

In some embodiments, the ground maintenance vehicle additionally includes: a first lever arm and a steering damper coupled with the first lever arm, where the first lever arm and steering damper provide steering feedback to an operator. In some embodiments, the steering damper is adjustable.

In some embodiments, a connecting rod assembly couples the steering control and the multi-axis articulating joint. In some such embodiments, the connecting rod assembly is mounted to a second lever arm, which transmits rotational movement from the steering control to the multi-axis steering joint. In other such embodiments, the connecting rod assembly further includes a bumper stop to limit rotation of the front caster steering assembly.

In some embodiments, the ground maintenance vehicle additionally includes a traction control lever attached to a transmission cable transmits movement from the traction control lever to a drive system. In other embodiments, the ground maintenance vehicle may additionally include a platform to support an operator.

In still yet another aspect, an articulating and caster system for use with a ground maintenance vehicle includes: a single lever steering assembly including a single lever steering control, where the single lever steering assembly coupled to a frame of the vehicle; a multi-axis articulating joint coupled to the frame of the vehicle; and a front caster steering assembly coupled to the multi-axis articulating joint, where the front caster steering assembly and the multi-axis articulating joint simultaneously provide articulating and caster steering proportional to lateral movement from the single lever steering control.

BRIEF DESCRIPTION OF THE DRAWINGS

In order that the embodiments may be better understood, embodiments of a vehicle with articulating and caster steering will now be described by way of examples. These embodiments are not to limit the scope of the claims as other embodiments of an orthopedic brace will become apparent to one having ordinary skill in the art upon reading the instant description. Non-limiting examples of the present embodiments are shown in figures wherein:

DETAILED DESCRIPTION OF THE INVENTION

Figure 1:
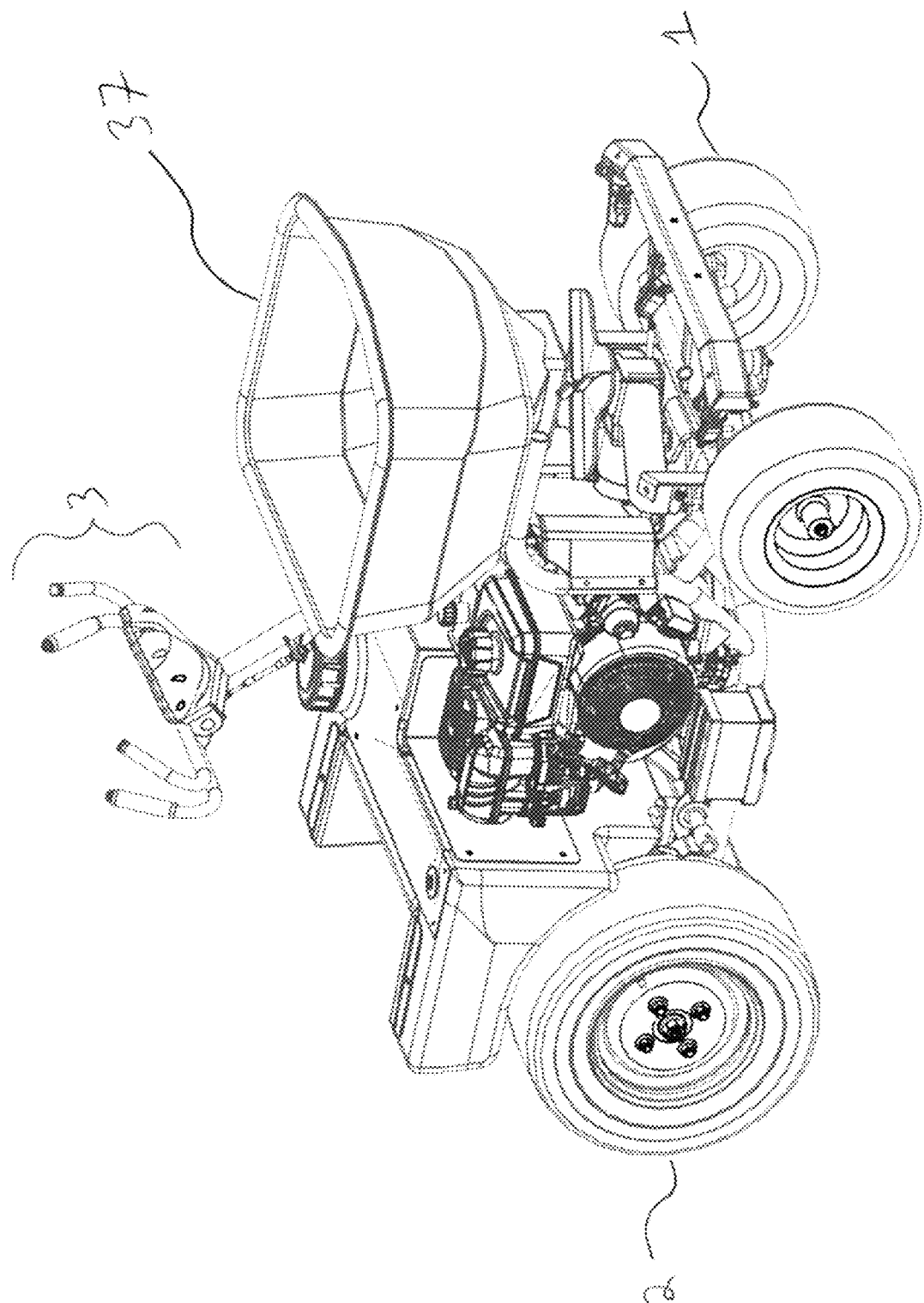
FIG. 1 is a front isometric view of a vehicle (riding applicator) that utilizes the steering system described herein. The front vehicle cover is removed to show the steering system.

It is to be understood that an articulating and caster steering system is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Figure 2:
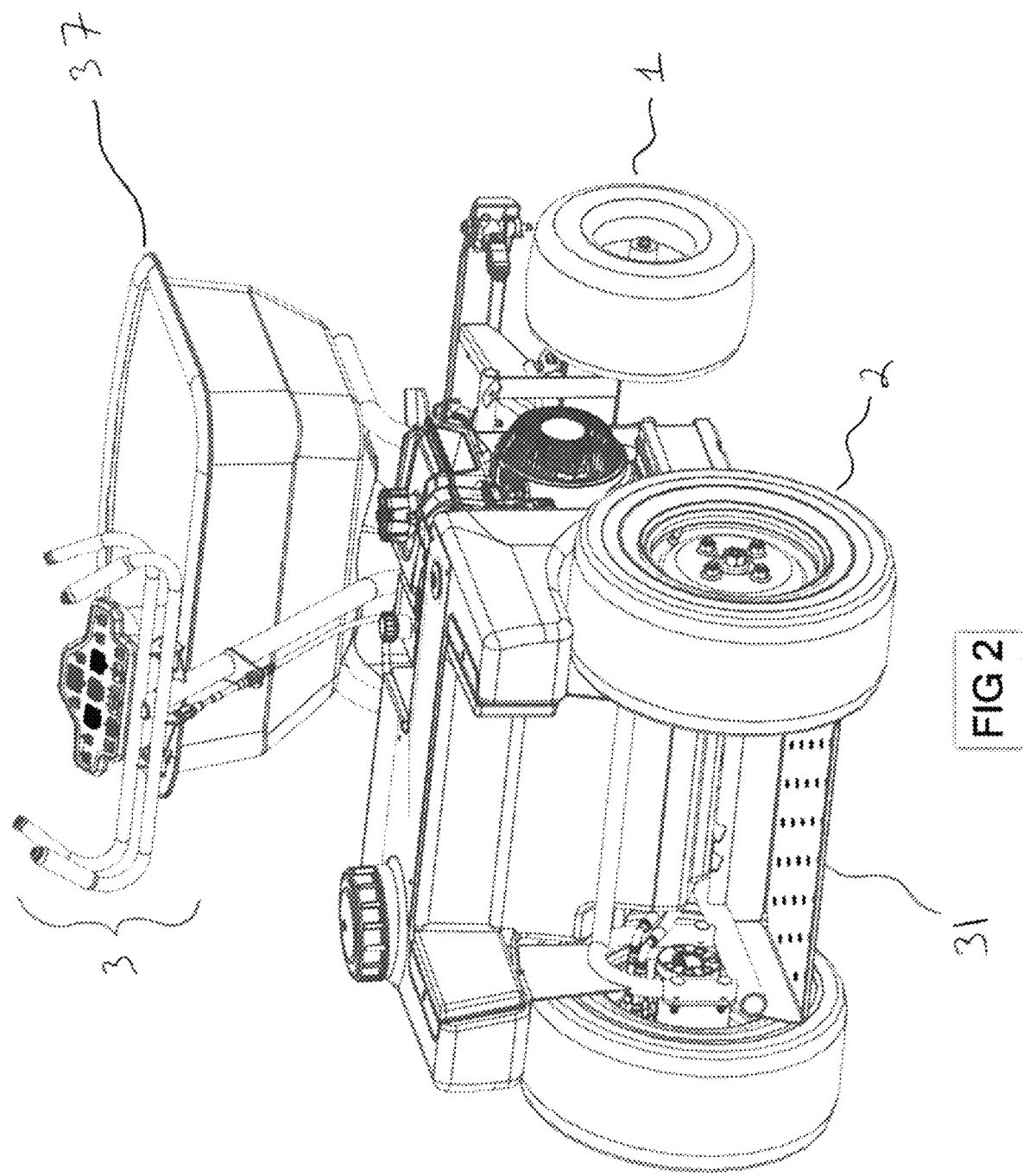
FIG. 2 is a rear isometric view of a vehicle (riding applicator) that utilizes the steering system described herein. The front vehicle cover is removed to show the steering system.
Figure 3:
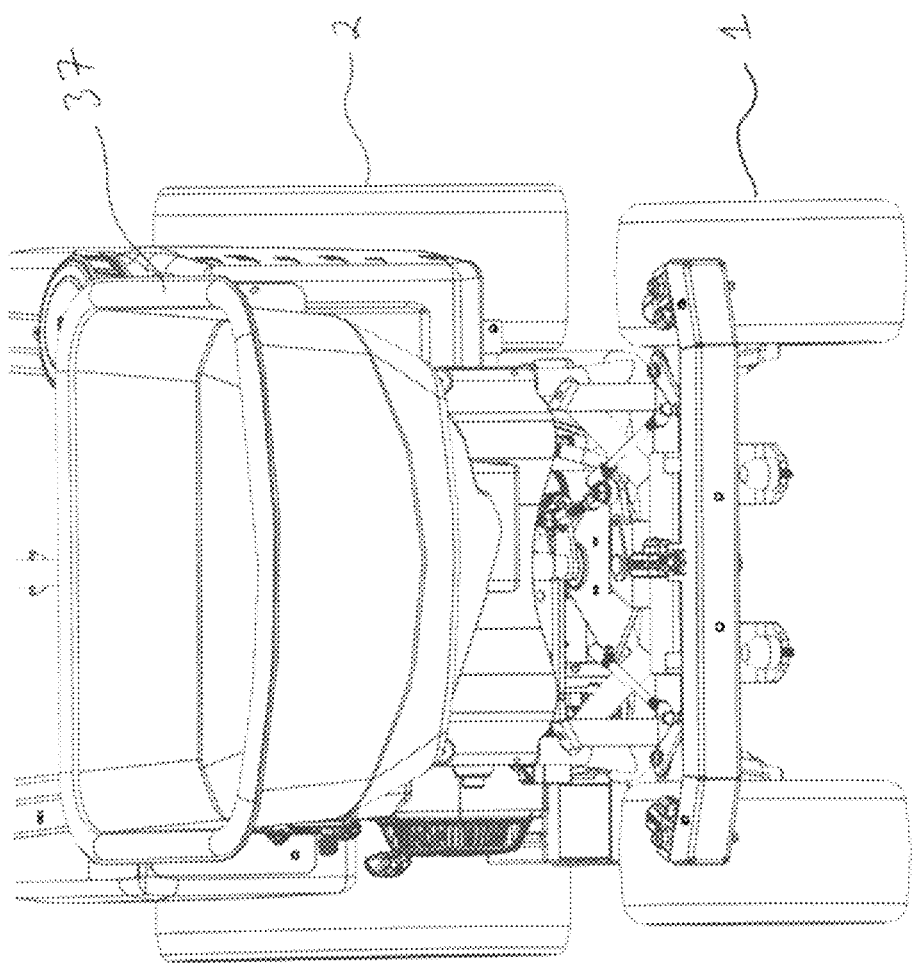
FIG. 3 is a rear view of a vehicle (riding applicator) that utilizes the steering system described herein. The front vehicle cover, spreader disk, and spreader motor are removed to show more detail of the steering system.

FIGS. 1-3 show a utility vehicle (riding applicator in this case) that utilizes the steering setup in accordance with the present invention. The vehicle has rear drive wheels 2 and a platform (see reference number 31 in FIG. 2), where an operator can stand between the rear drive wheels and steer the vehicle using the control handle 3 that simultaneously provides articulation and caster steering based on the user input. FIG. 2 shows a rear isometric view where the operator stands on a platform 31 located between the rear drive wheels 2. FIG. 3 shows a front view of the steering linkages with the front cover, spreader impeller, and spreader motor removed for better viewing of the steering assembly.

Figure 4:
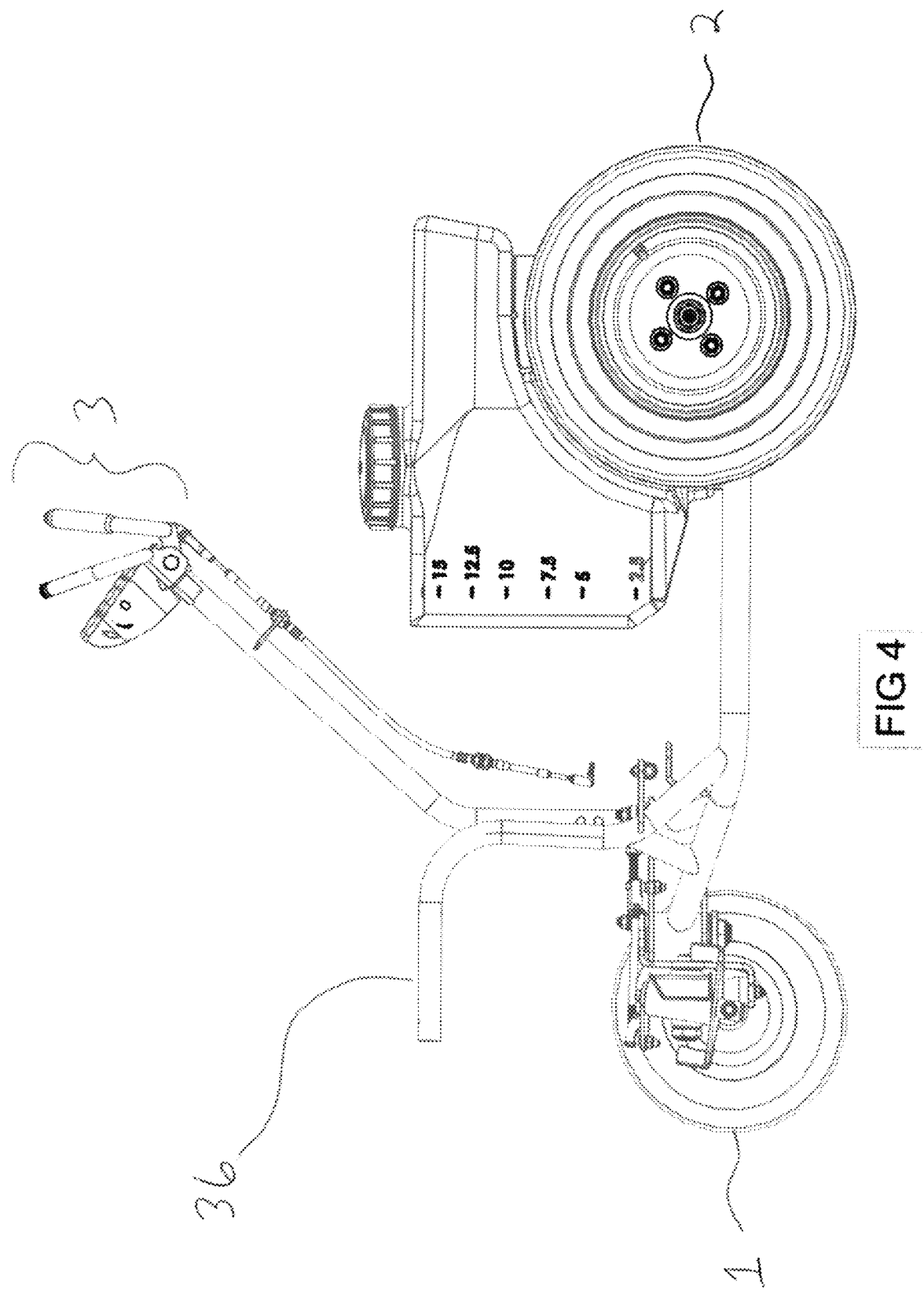
FIG. 4 is a side view of the vehicle with certain portions removed to improvement view of the steering system.
Figure 5:
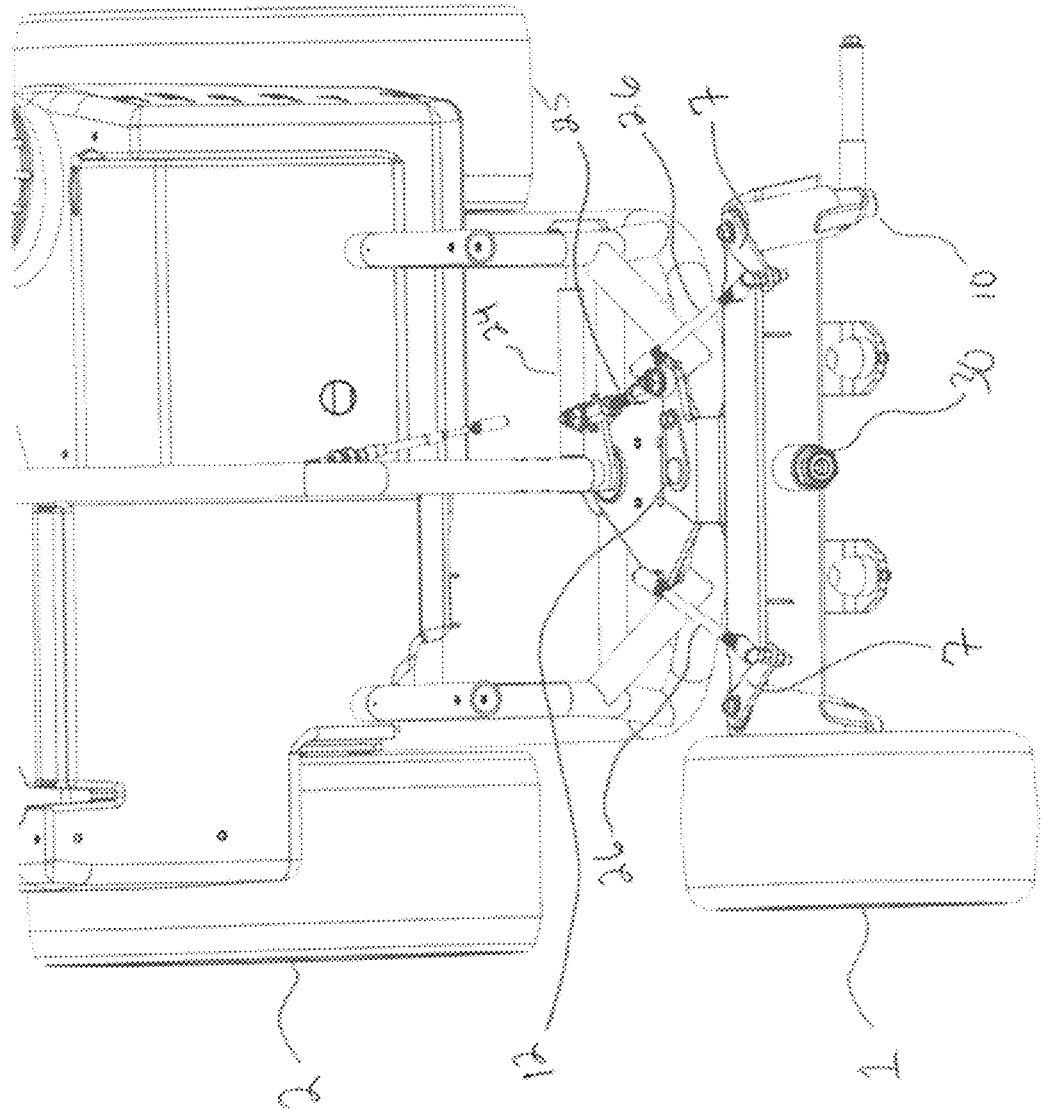
FIG. 5 is a front view of the vehicle with certain portions removed to improve view the steering system.
Figure 6:
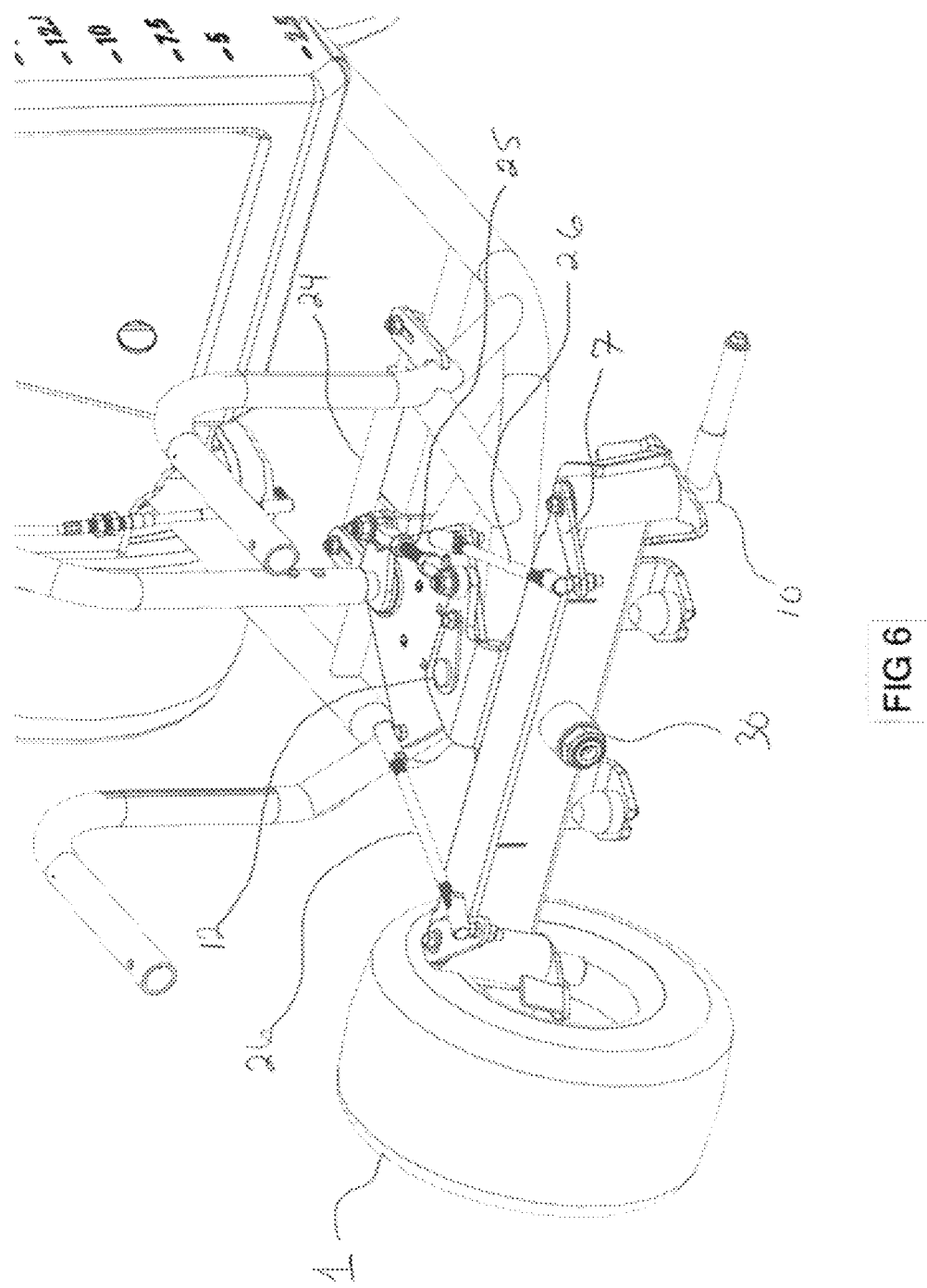
FIG. 6 is a front isometric of the vehicle with certain portions removed to improve view the steering system.

FIGS. 4-6 shows the steering setup with items of the vehicle removed that are not part of the steering setup. FIG. 4 is a side view of the steering geometry, including fertilizer hopper mounting arms 36 for supporting the fertilizer hopper 37 (see FIGS. 1-3). FIGS. 5 and 6 each show a detailed view (omitting the right front steering tire 1) as if the vehicle were not turning and only driving straight forward. FIGS. 5 and 6 illustrate how control rod 26 is able to transmit the articulating movement of assembly 11 into a caster steering motion. Specifically, control rod 26 may pivotally coupled to a fixed point on the frame on one end and to the steering tab 7 on the opposite end. The control rod 26 provides the appropriate amount of caster steering for the front steering wheel based on the articulating movement of joint 13 which provides an articulating movement to assembly 11.

Figure 7:
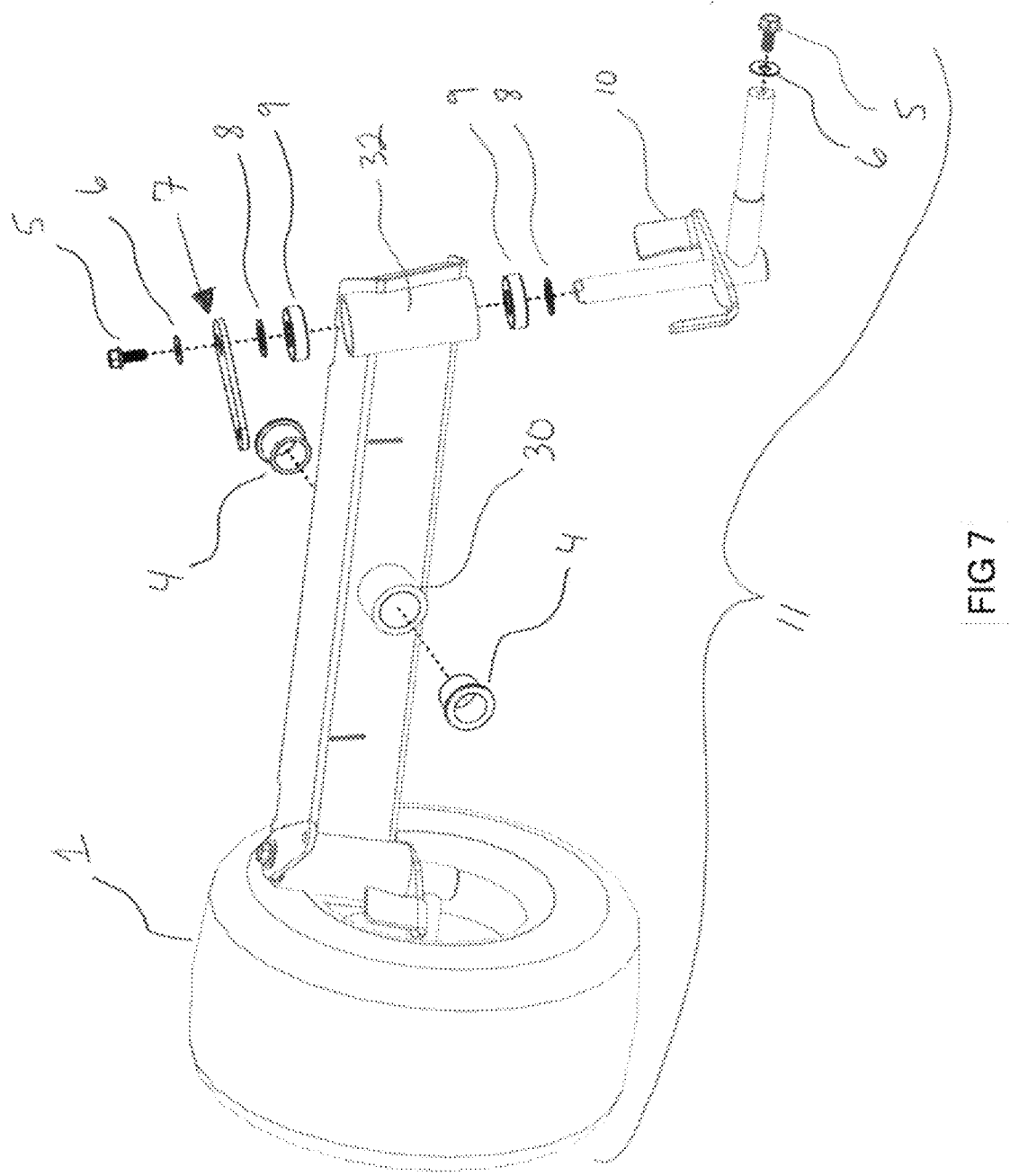
FIG. 7 is an exploded detailed view of a front caster steering assembly described herein.

FIG. 7 shows the front caster steering assembly 11 of the invention. This assembly allows for articulation along a longitudinal axis A (illustrated in broken line) along the direction of travel around the pivot tube 30. This articulation allows for even pressure on both front tires on uneven terrain, specifically while turning. The steering assembly 11 pivots around on two bushings 4 mounted within the pivot tube 30. Additionally, there are steering knuckles 10 that pivot about a caster pivot housing 32, the steering knuckles may utilize bearings 9 free movement. The steering knuckle assembly pivot may consist of the steering knuckle 10, the bearing shims or spacers 8, bearings 9, and the caster pivot housing with a steering control bracket 7 attached as shown utilizing washer 6 and bolt 5 as shown. This steering assembly 11 can provide caster steering, as well as side to side articulation.

Figure 8:
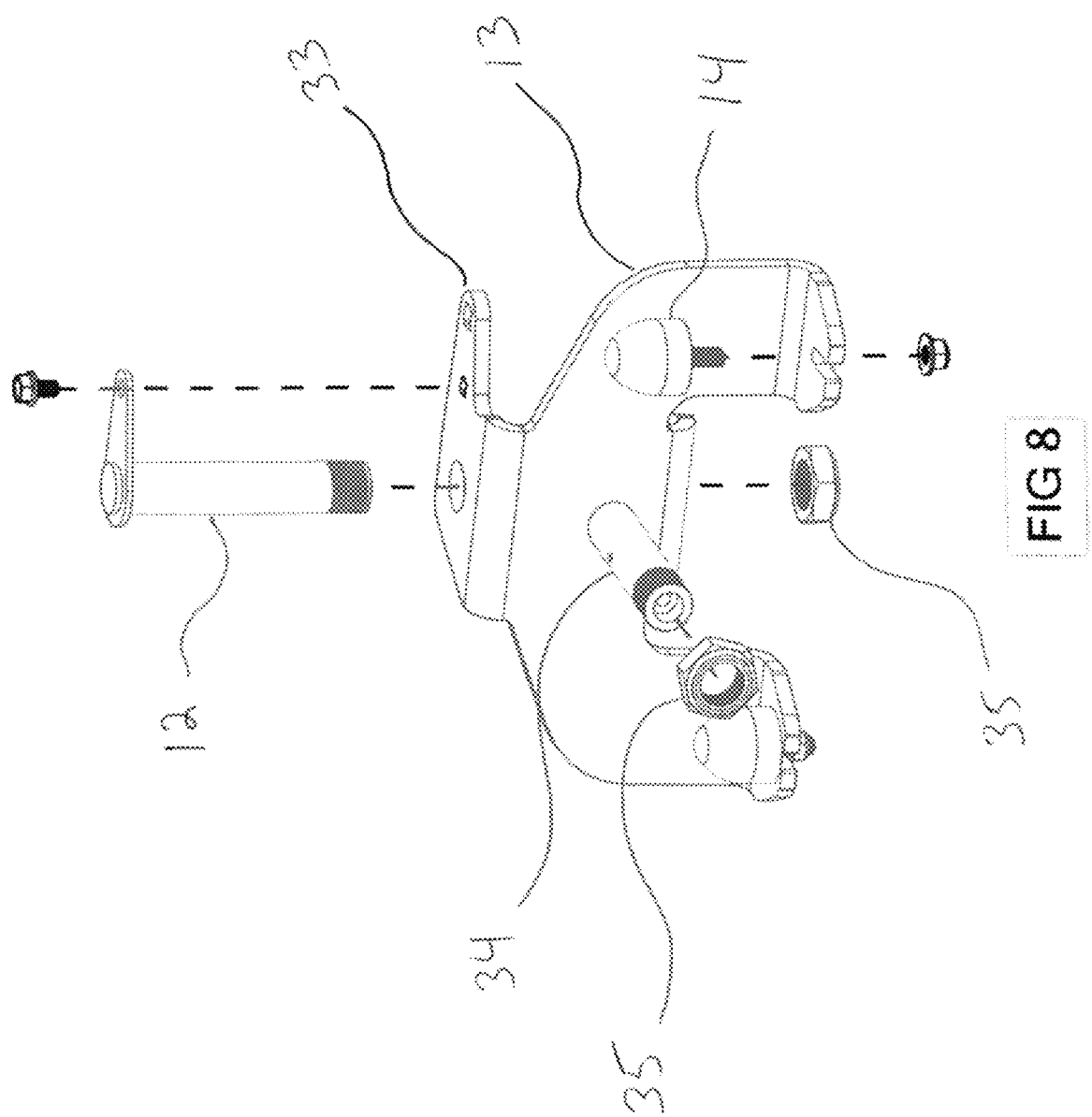
FIG. 8 is a front exploded detailed view of the multi-axis articulating pivot assembly utilized in the steering system.
Figure 9:
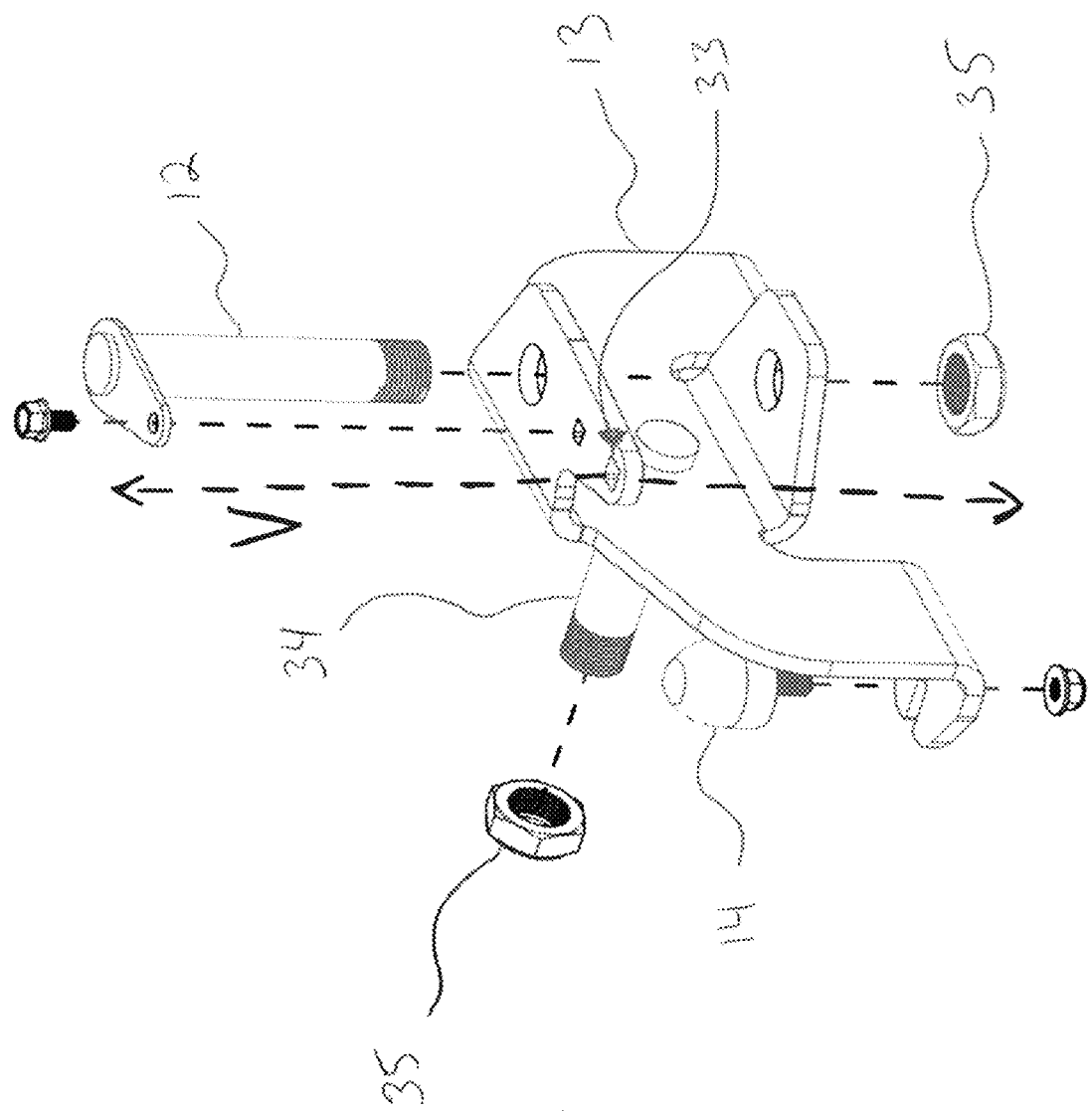
FIG. 9 is a rear exploded detailed view of the multi-axis articulating pivot assembly utilized in the steering system.

FIGS. 8-9 show a multi-axis articulation joint. This multi-axis joint consists of an assembly joint 13 that encompasses pivot shaft 34, which allows movement along a longitudinal axis L (illustrated in broken line) to allow a front tire to articulate on uneven ground. This may be particularly desirable for areas with hills. This assembly joint 13 may also allow for articulation along a vertical axis around pivot pint 12 to allow for side to side articulation of the caster steering assembly 11 (see e.g. FIG. 16). Steering connecting rod (not visible in FIGS. 8-9, see 25 in FIGS. 5-6) attaches to mounting point 33 to control the articulation around the vertical axis V. In some implementations, there may also be bumper stop 14 to limit the rotation of the front caster steering assembly along the longitudinal axis. For example, the bumper stop 14 may be constructed of a durable polymer, but this is not intended to be limiting. Nut 35 may be used to retain the pivot pin 12 and front caster steering assembly 11.

Figure 10:
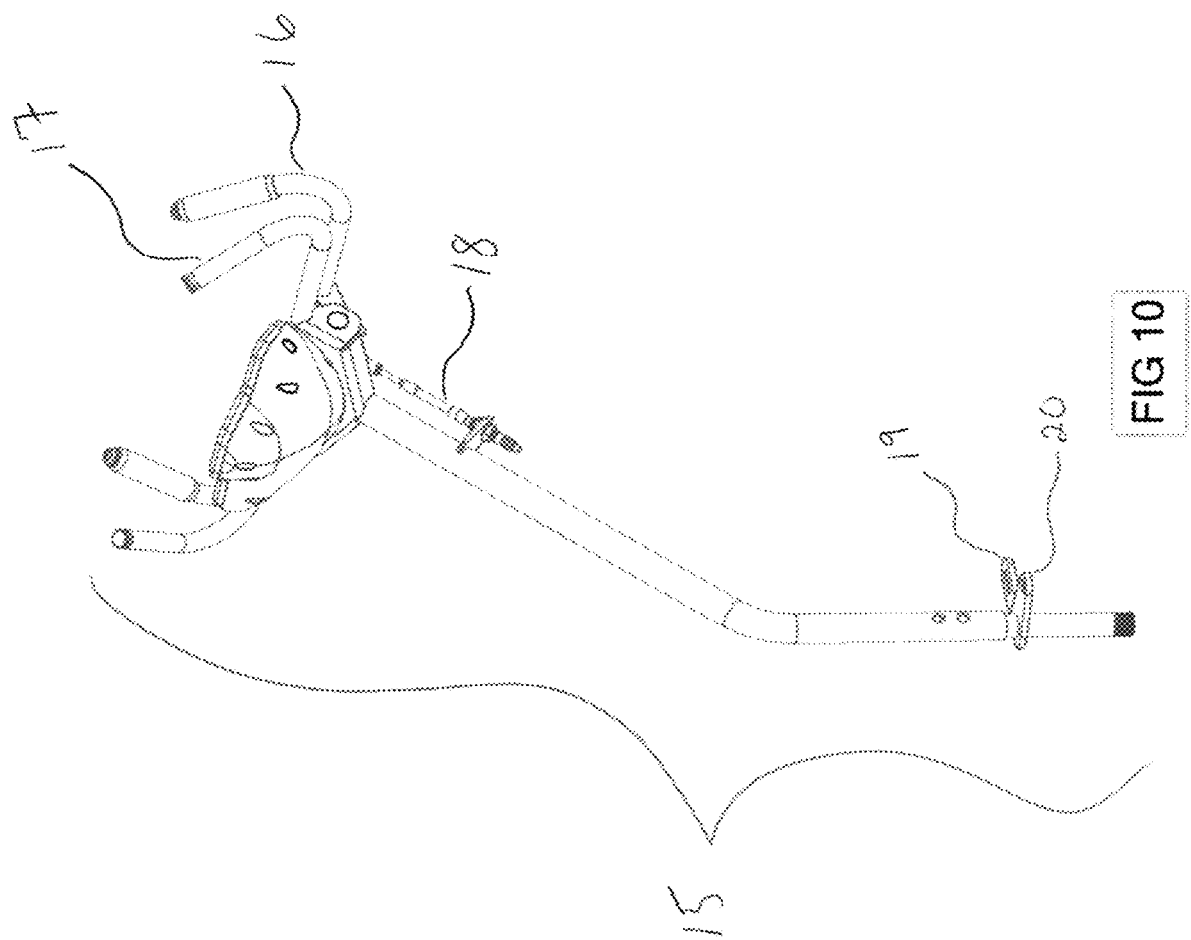
FIG. 10 is a front isometric view of the single lever steering control assembly.
Figure 11:
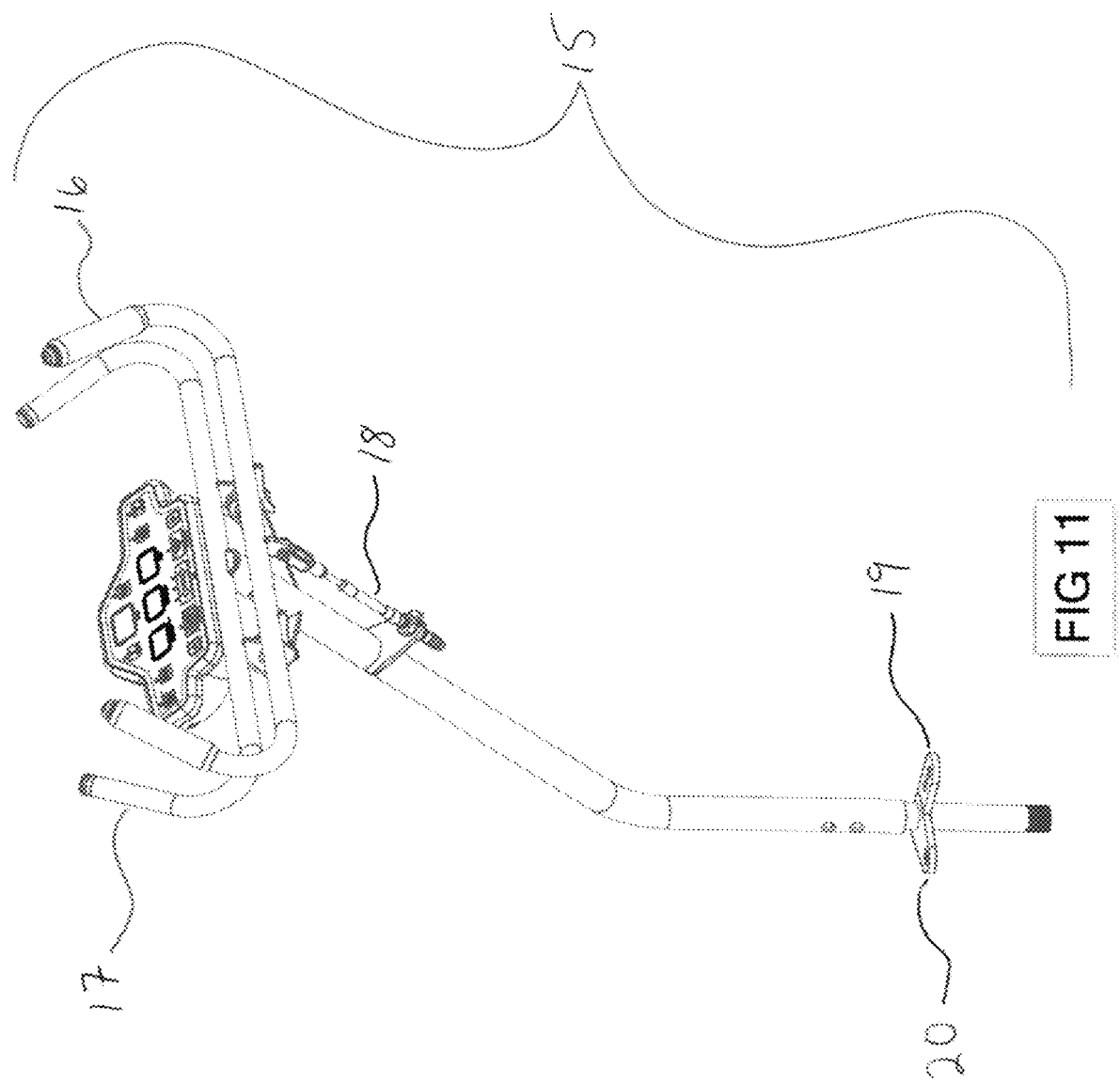
FIG. 11 is a rear isometric view of the single lever steering control assembly.
Figure 12:
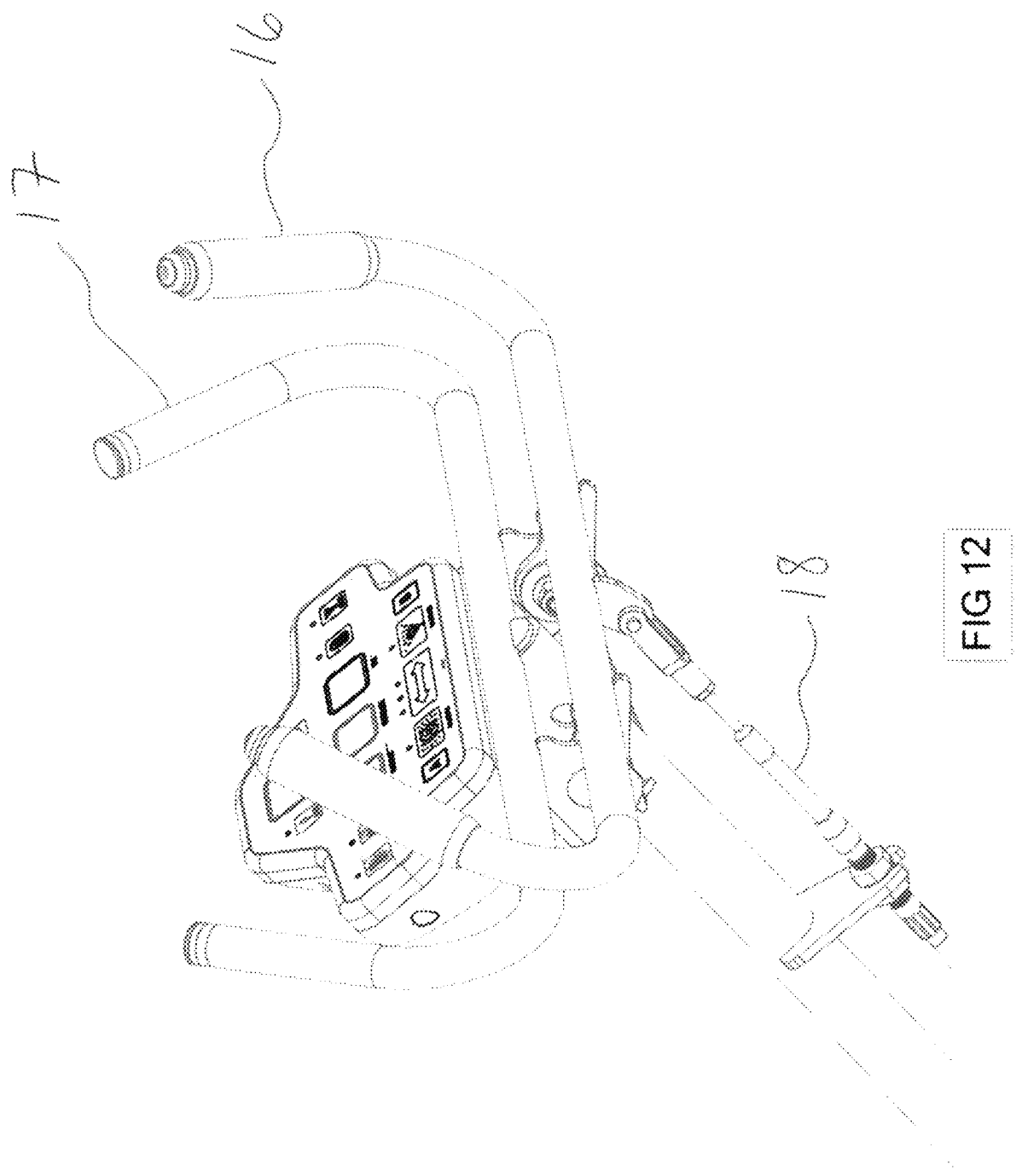
FIG. 12 is an enlarged detailed view of the upper steering control assembly.

FIGS. 10-12 shows a single lever steering control 17 that may also, in some implementations. encompasses a traction control lever 16. The traction control lever 16 may be attached to a transmission cable 18 that transmits movements from the traction control lever to control input on the transmission or drive system of the vehicle. The lower section of the single lever steering assembly 15 may include a first lever arm 19 and a second lever arm 20. The first lever arm 19 may be used in conjunction with a steering damper (see 24 in FIGS. 5 and 6) to dampen the steering movement, and to provide steering feedback or "feel" to the operator. The second lever arm 20 may be where steering connecting rod (see 25 in FIGS. 5-6) mounts and transmits rotational movement from the single lever steering assembly 15 to the multi-axis steering joint 13 described in FIGS. 8-9.

Figure 13:
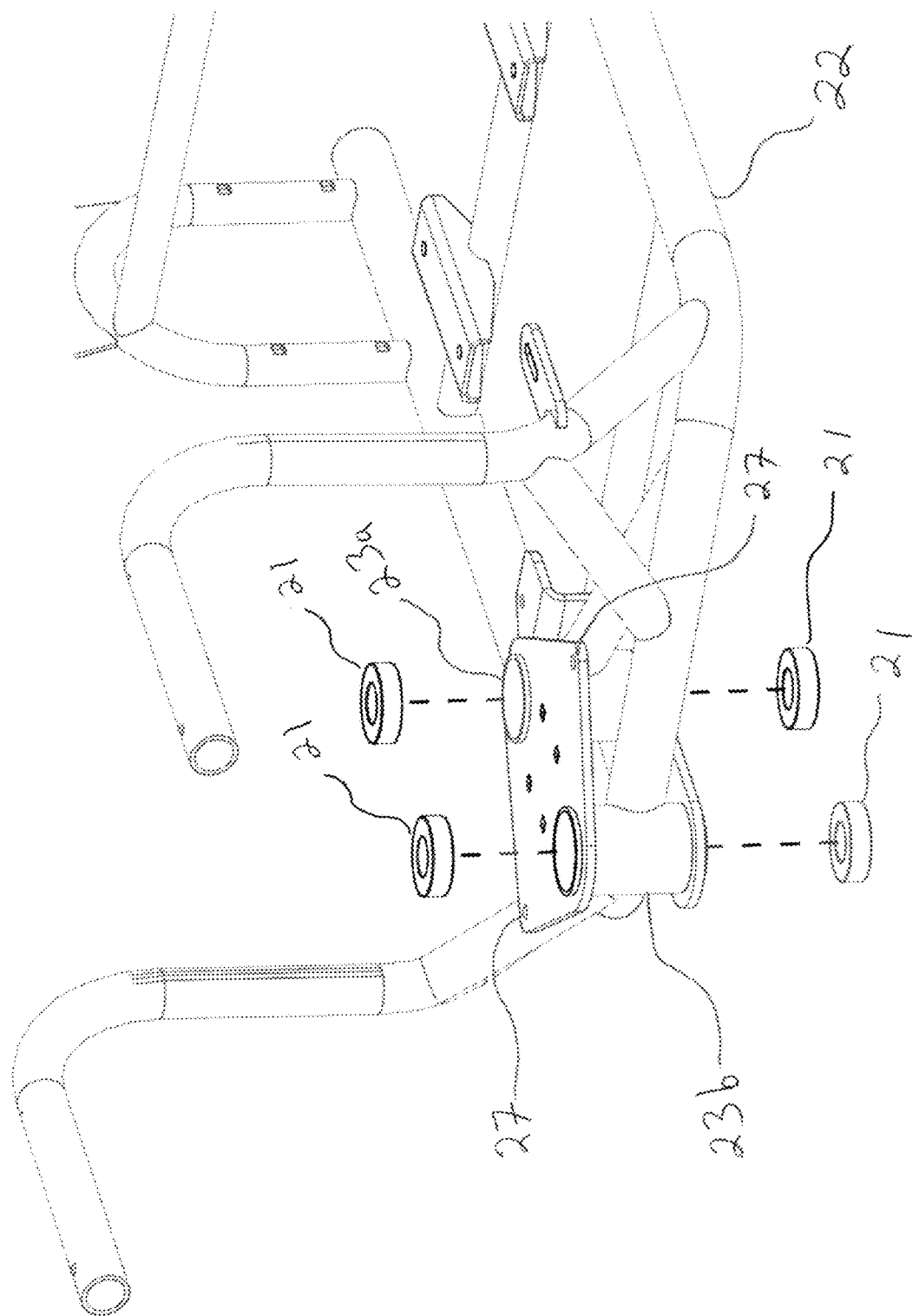
FIG. 13 is an enlarged, detailed, exploded view of the vehicles front frame articulating setup with bearings.
Figure 14:
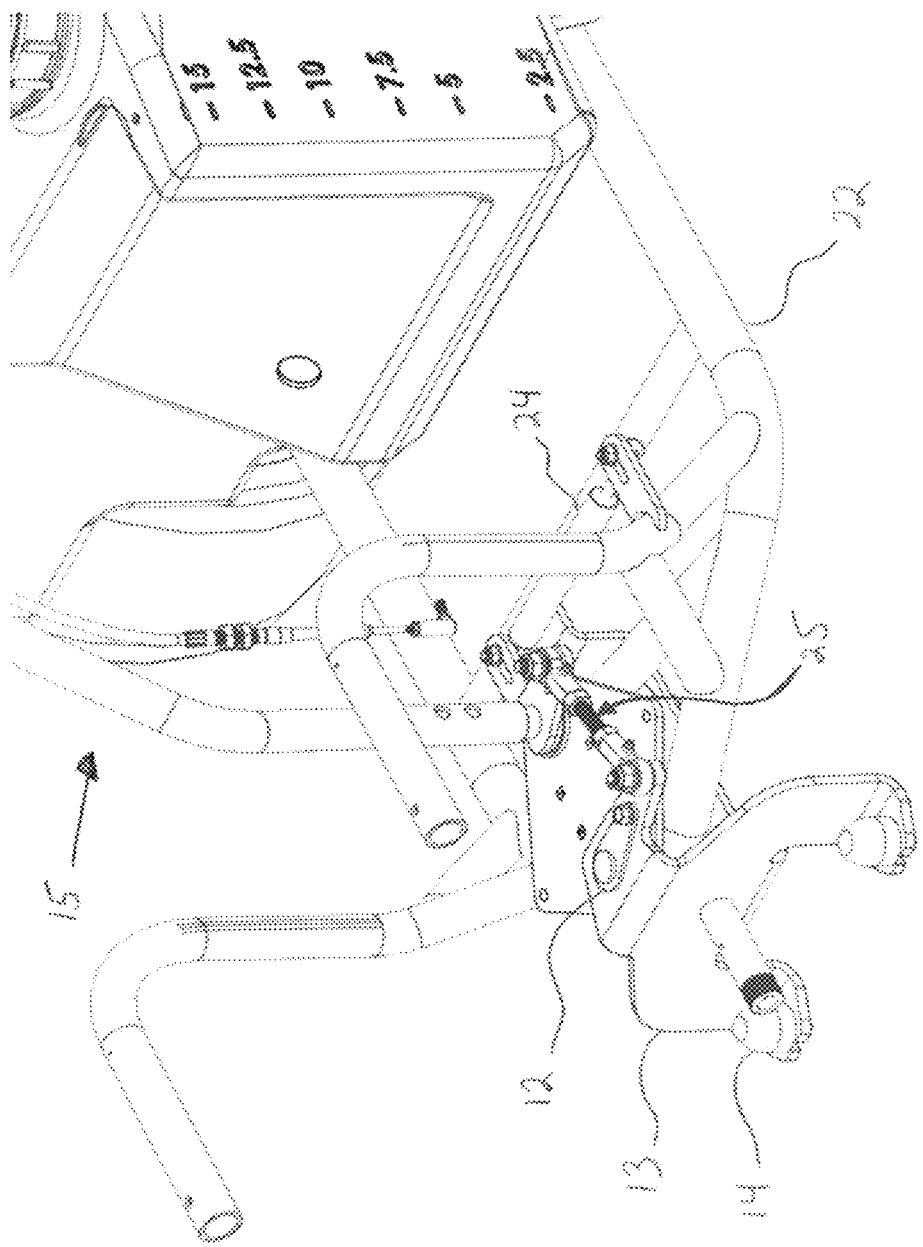
FIG. 14 is an enlarged, detailed, top view of the vehicles articulating section with the steering lever and articulating pivot assembly installed.
Figure 15:
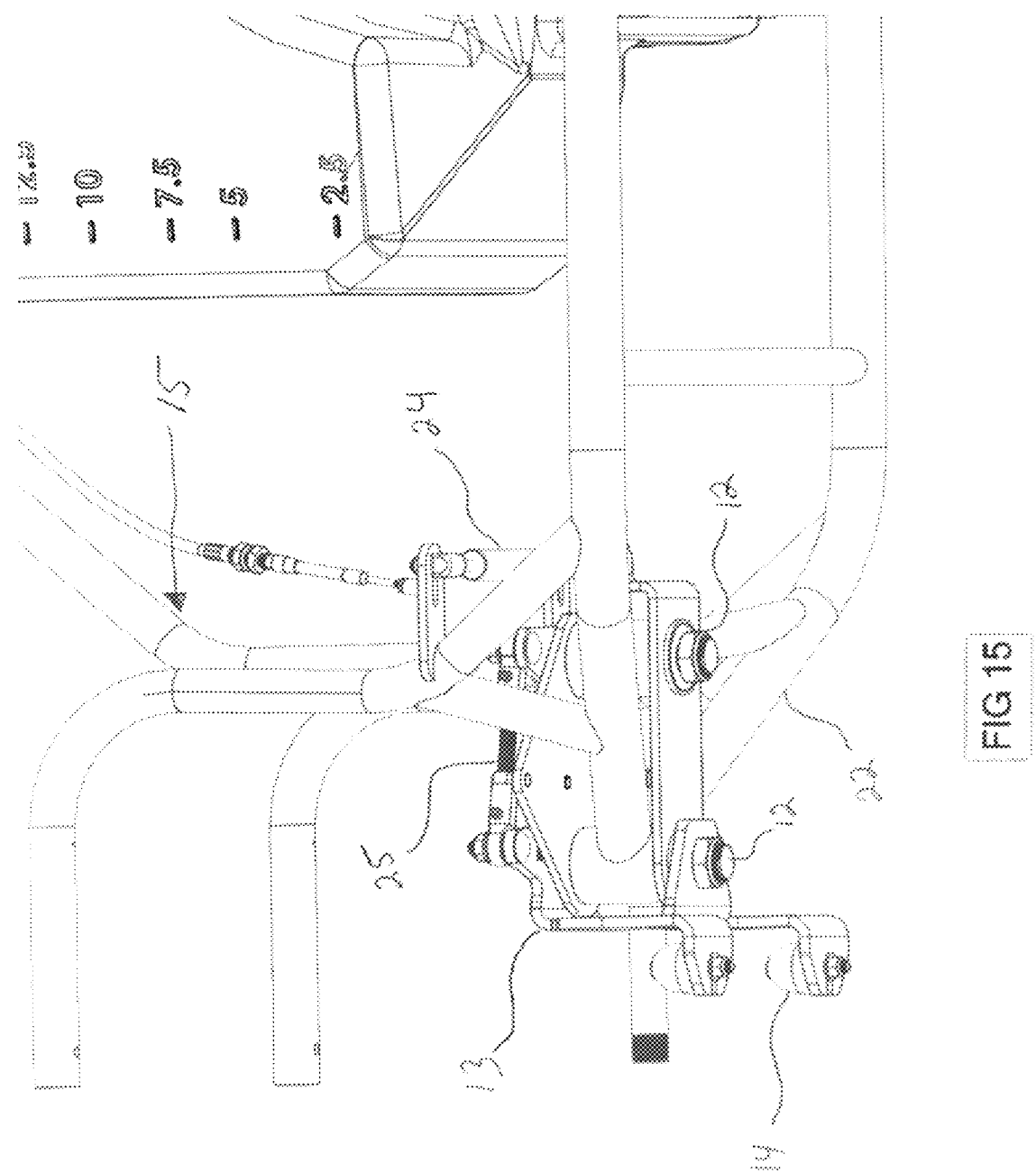
FIG. 15 is an enlarged, detailed, bottom view of the vehicles articulating section with the steering lever and articulating pivot assembly installed.

FIG. 13 is a front detailed view of the vehicle frame 22 showing the two pivot points 23a, 23b. The rear pivot housing 23a utilizes two bearings 21. The front pivot housing 23b also utilizes two bearings 21. FIGS. 14-15 shows the single lever steering assembly 15 installed in the rear pivot housing 23a. Additionally, it shows the multi-axis articulating joint 13 installed in the forward pivot housing 23b. The single lever steering assembly 15 and the multi-axis articulating joint 13 may be coupled using the steering connecting rod assembly 25. This connecting rod 25, transmits rotational movements from the single lever steering assembly 15 to an articulation movement in the multi-axis articulating joint 13. FIGS. 14-15 also illustrate a steering damper 24 that, as described previously, may be used to dampen the steering movements. The steering damper 24 may be mounted on slots 38 (see FIG. 16) where the user can adjust the damper 24. For example, a user may alter the effect of the damper by moving it forward for less dampening effect. The damper is shown the rear or most stiff position, but this is not to be construed as limiting. A pivot pin assembly 12 is used for the vertical pivot point on the forward pivot joint 23b. Locking nuts 23 are used to secure the pivot pin assembly 12 and the single lever steering assembly 15.

Figure 16:
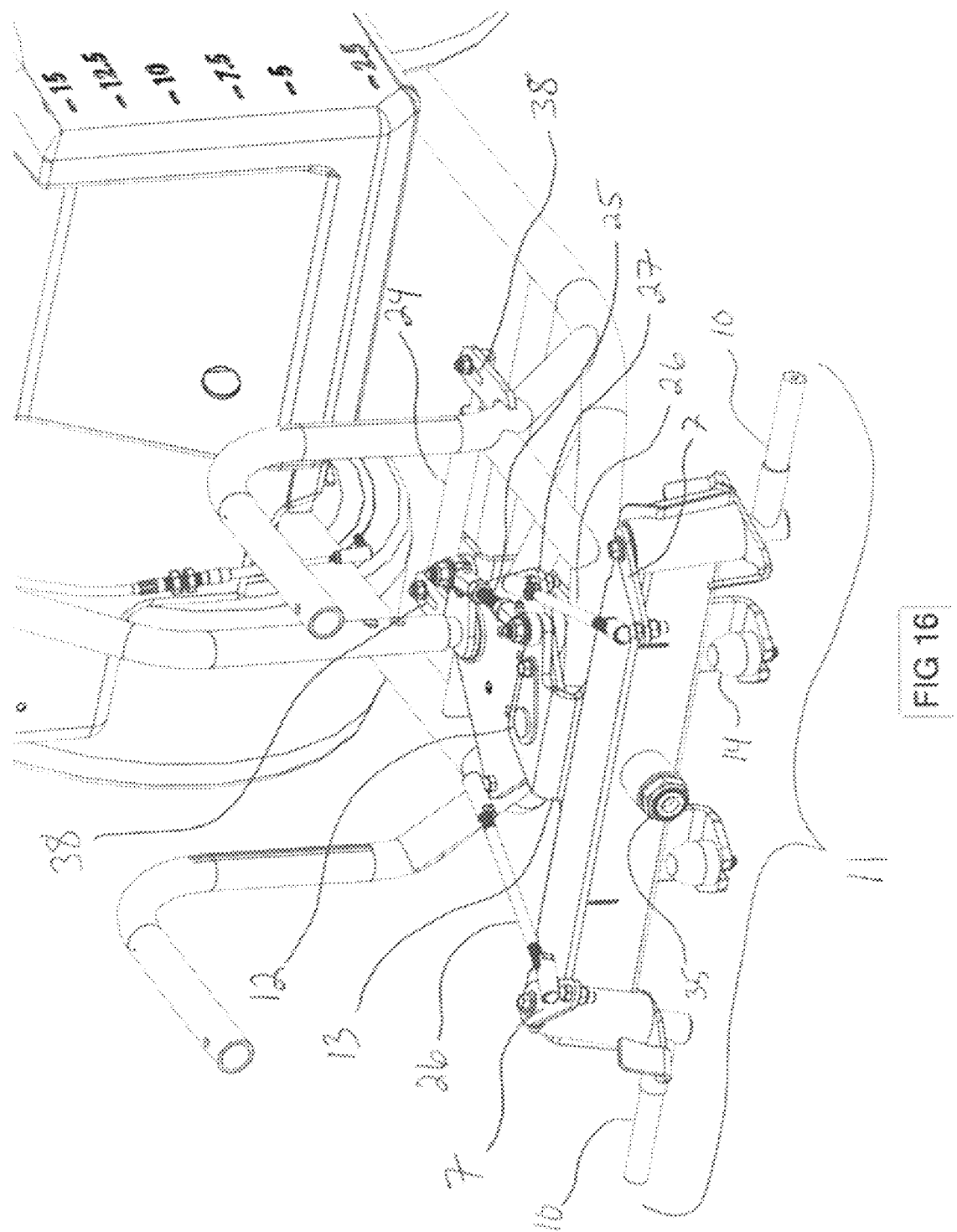
FIG. 16 is the enlarged view from FIG. 14 with the caster steering assembly of FIG. 7 installed.

FIG. 16 shows the front caster steering assembly 11, with the front tires 1 removed, installed on the multi-axis articulating joint 13. The front caster assembly 11 may be held in place on the multi-axis articulating joint 13 using nut 35. Tie rod assembly 26 includes a first end connected to a fixed point on the vehicle frame at connection point 27. A second end of the tie rod assembly 26 is connected to the end of steering arm 7, as shown.

Figure 17:
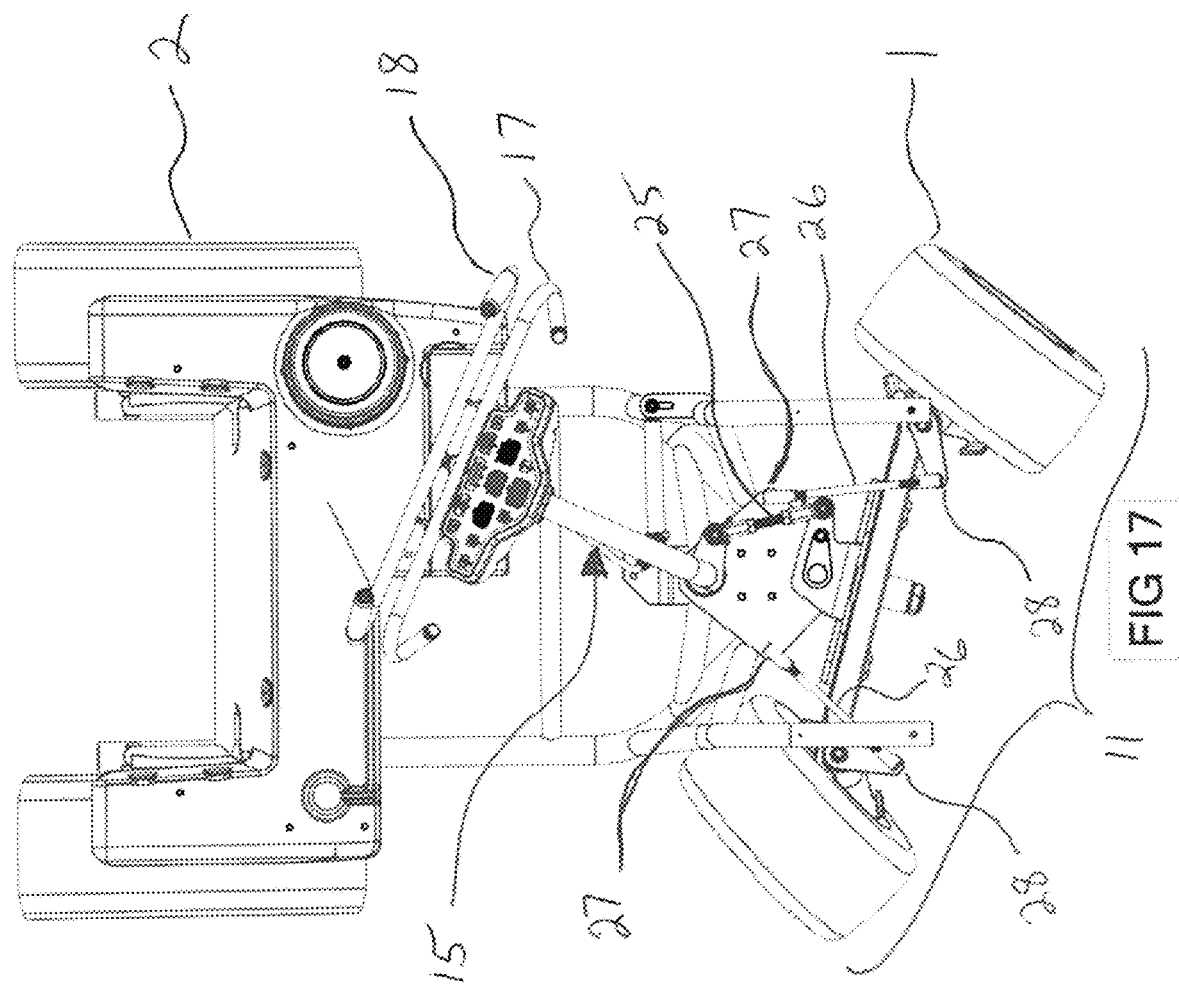
FIG. 17 is a top view of the steering system showing a sharp right turn.
Figure 18:
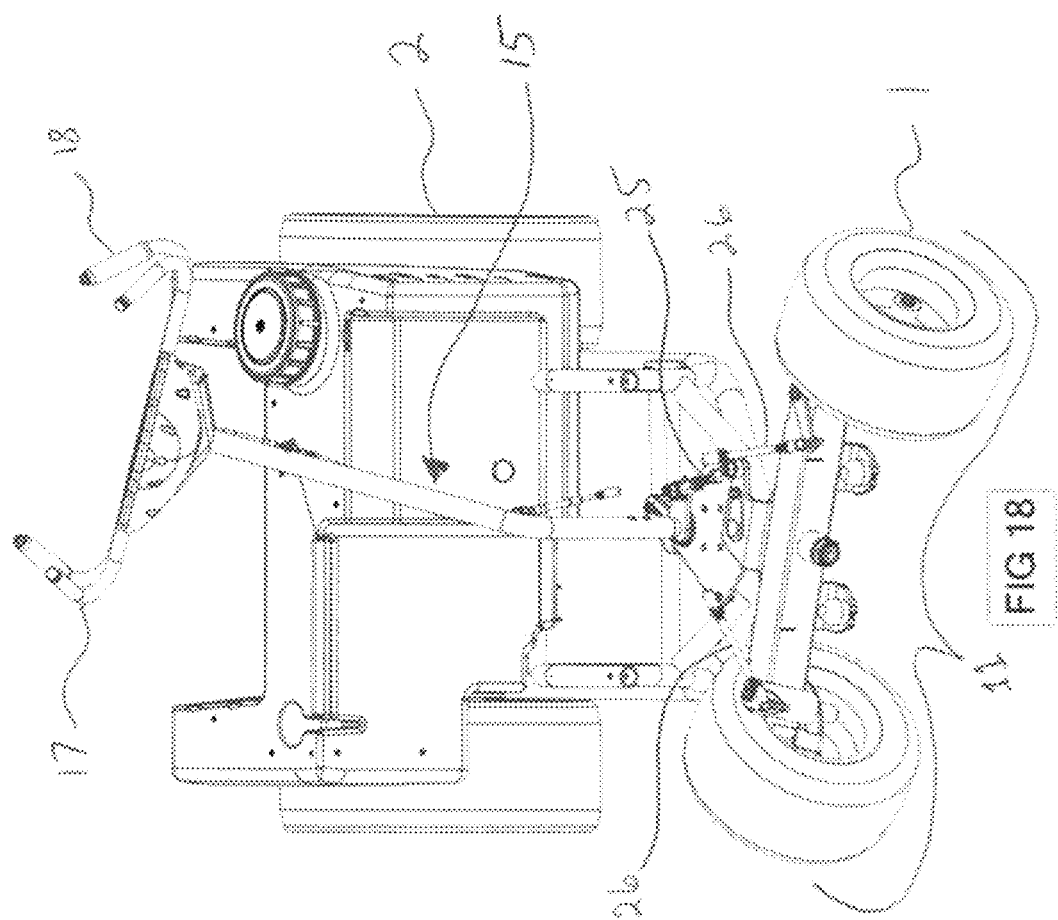
FIG. 18 is a front view of the steering system showing a sharp right turn.
Figure 19:
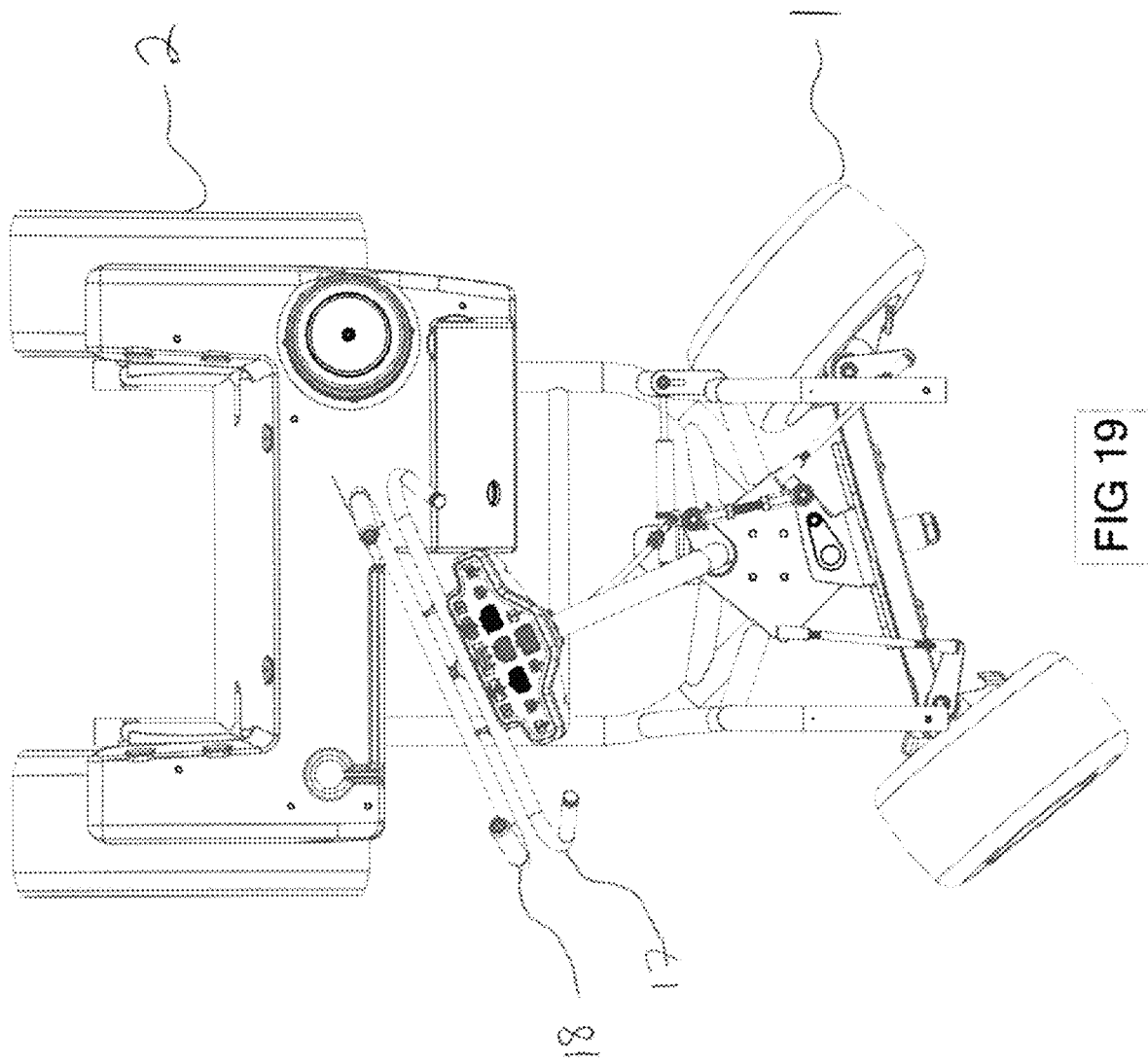
FIG. 19 is a top view of the steering system showing a sharp left turn.
Figure 20:
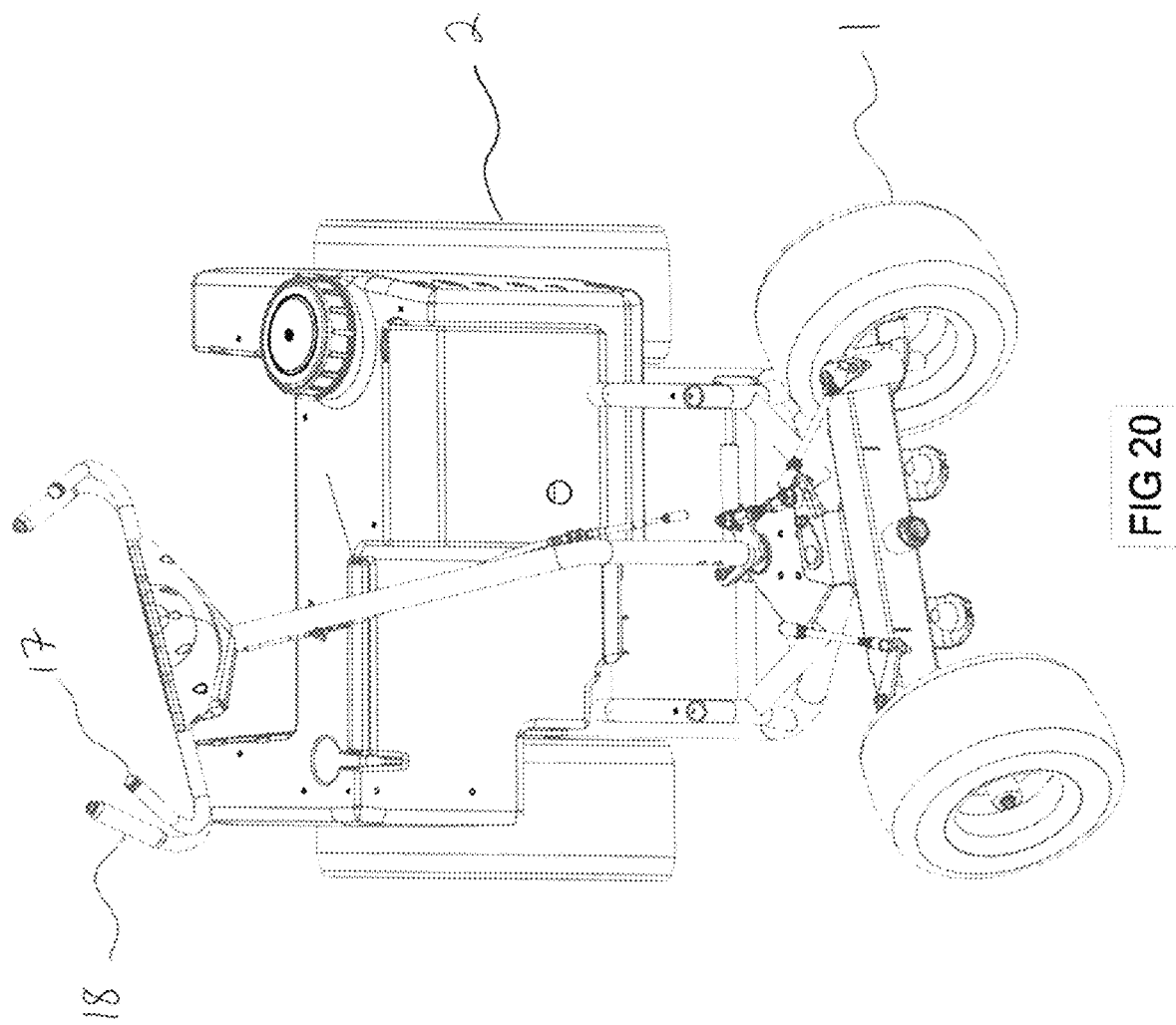
FIG. 20 is a front view of the steering system showing a sharp left turn.

FIGS. 17-18 illustrate top views of the vehicle making a sharp right turn, as well as illustrate how the steering geometry reacts to steering inputs. In the illustrated example, the single lever steering control assembly 15 is turned as shown (e.g. as illustrated, 24 degrees from center). This movement, which is in a comfortable range of motion for an operator, may yield a desired sharp turning radius of approximately 36". The single lever steering assembly 15 pivots around joint 23a (see FIG. 13) where the rotation motion is transmitted to the multi-axis articulating joint 13 through the connecting rod 25 mounted at second lever arm 20 on one end (see FIGS. 10-11) and mounting point 33 on the opposing end (see FIGS. 8 9). The tie rod assembly 26 may then transmit a caster steering movement to the front tires 1 for steering, as the front caster steering assembly 11 is articulated side to side by the multi-axis articulating joint about a vertical axis. The tie rod assembly 26 are fixed on the frame at connection point 27 allowing the steering knuckle 10 to caster steer according to movements provided by the user inputs at the steering lever 17. FIGS. 19-20 illustrate another same sharp, similar to that of FIGS. 17-18, except turning to the left.

Figure 21:
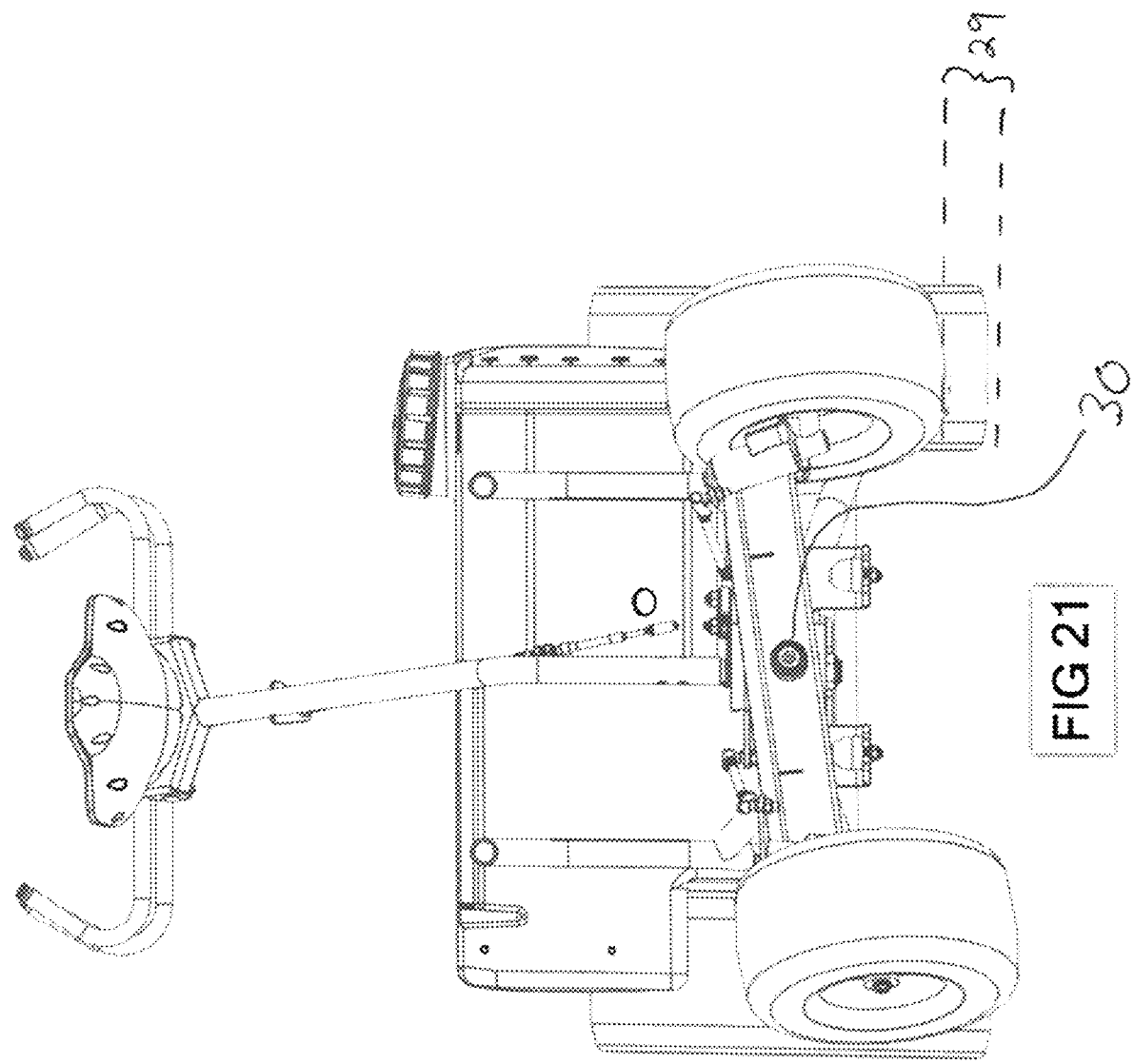
FIG. 21 is a front view of the steering system showing turning while articulating for uneven terrain.
Figure 22:
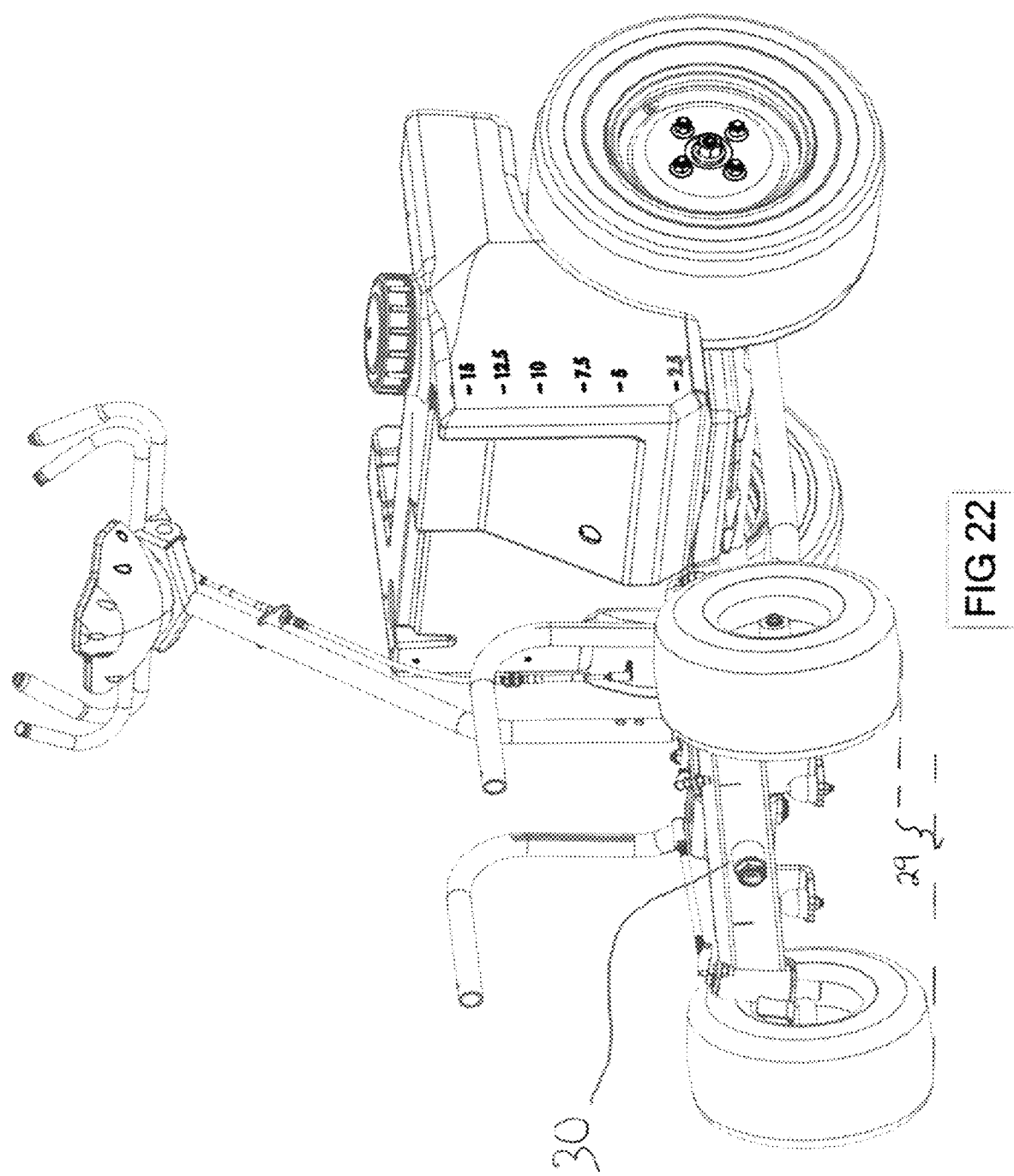
FIG. 22 is a front isometric view of the steering system showing turning while articulating for uneven terrain.
Figure 23:
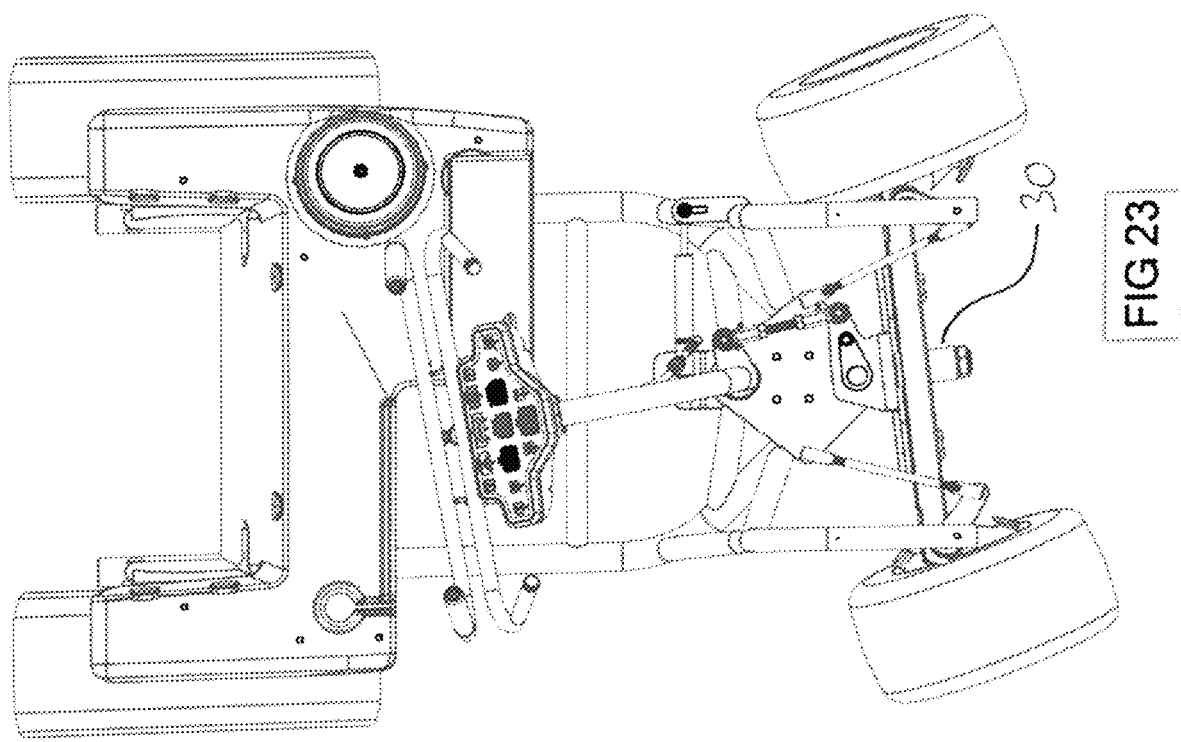
FIG. 23 is a top down view of the steering system showing turning while articulating for uneven terrain.

FIGS. 21-23 illustrate the vehicle making a left turn, while also encompassing articulation in the caster steering assembly 11 along the longitudinal axis, as shown. As illustrated, the vehicle is driving across uneven terrain, e.g. a raised distance from ground plane 29, while turning. The articulation and front axle pivoting allows the steering tires 1, to remain in contact with the ground and distribute pressure to allow for turning between both front tires.

Additionally, it should also be noted that in the illustrated embodiment, a riding broadcast spreader is illustrated with a fertilizer hopper 37 mounted to the main frame 22 on frame mounting arms 36, and not the front articulating part of the vehicle. In contrast, a fertilizer hopper is typically mounted to the front half of the articulating frame that is coupled to the steering handle assembly. In the traditional design, the operator has to contend with the weight of the fertilizer while turning (articulating) the machine. This additional 100-200 lbs. of weight or mass in the steering assembly increases the steering effort on the operator.

Furthermore, although illustrated as a riding broadcast seeding, the articulating and caster steering system described herein is not so limited and may be used with other types of vehicles. For example, the articulating and caster system illustrated and described herein may be used with a riding mower, riding blower, riding sweeper, or any other machine where an operator may stand and ride.

The overall invention allows for a compact tighter turning vehicle with better turning response and less effort than previously available. The steering controls allows for minimal operator training over dual-hydro, zero turn, vehicles and with better performance on hills.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A ground maintenance vehicle comprising:
one or more front steering wheels;
one or more rear drive wheels;
a frame including a first pivot point and a second pivot point;
a single lever steering assembly including a single lever steering control, wherein the single lever steering assembly is coupled to the first pivot point;
a multi-axis articulating joint coupled to the second pivot point;
wherein the multi-axis articulating joint allows for movement along a longitudinal axis and along a vertical axis;
a front caster steering assembly coupled to the multi-axis articulating joint; and
wherein the front caster steering assembly and the multi-axis articulating joint simultaneously provide articulating and caster steering proportional to lateral movement from the single lever steering control.

2. The ground maintenance vehicle of claim 1, further comprising:

a first lever arm;
a steering damper coupled with the first lever arm; and
wherein the first lever arm and steering damper are configured to provide steering feedback to an operator.

3. The ground maintenance vehicle of claim 2, wherein the steering damper is adjustable.

4. The ground maintenance vehicle of claim 1, wherein a connecting rod assembly couples the single lever steering assembly and the multi-axis articulating joint.

5. The ground maintenance vehicle of claim 4, wherein the connecting rod assembly is mounted to a second lever arm, and the second lever arm is configured to transmit rotational movement from the single lever steering assembly to the multi-axis steering joint.

6. The ground maintenance vehicle of claim 5, wherein the connecting rod assembly further includes a bumper stop to limit rotation of the front caster steering assembly.

7. The ground maintenance vehicle of claim 1, further comprising a traction control lever attached to a transmission cable and configured to transmits movement from the traction control lever to a drive system.

8. The ground maintenance vehicle of claim 1, wherein the single lever steering assembly pivots around a bushing mounted within a pivot tube.

9. The ground maintenance vehicle of claim 1, wherein the frame further includes one or more frame mounting arms configure to receive a fertilizer hopper.

10. The ground maintenance vehicle of claim 1 further comprising a platform configured to support an operator.

11. The ground maintenance vehicle of claim 1, wherein the front caster steering assembly control rod is fixed to a caster steering assembly on a first end and to the frame on a second end.

12. A ground maintenance vehicle comprising:
one or more front steering wheels;
one or more rear drive wheels;
a frame, the frame including one or more frame mounting arms on a reward section of the ground maintenance vehicle;
a multi-axis articulating joint coupled to the frame;
wherein the multi-axis articulating joint allows for movement along a longitudinal axis and along a vertical axis;
a front caster steering assembly coupled to the multi-axis articulating joint, wherein the front caster steering assembly and the multi-axis articulating joint simultaneously provide articulating and caster steering proportional to lateral movement from a steering control.

13. The ground maintenance vehicle of claim 12, further comprising:
a first lever arm;
a steering damper coupled with the first lever arm; and
wherein the first lever arm and steering damper are configured to provide steering feedback to an operator.

14. The ground maintenance vehicle of claim 13, wherein the steering damper is adjustable.

15. The ground maintenance vehicle of claim 12, wherein a connecting rod assembly couples the steering control and the multi-axis articulating joint.

16. The ground maintenance vehicle of claim 15, wherein the connecting rod assembly is mounted to a second lever arm, and the second lever arm is configured to transmit rotational movement from the steering control to the multi-axis steering joint.

17. The ground maintenance vehicle of claim 16, wherein the connecting rod assembly further includes a bumper stop to limit rotation of the front caster steering assembly.

18. The ground maintenance vehicle of claim 12, further comprising a traction control lever attached to a transmission cable and configured to transmits movement from the traction control lever to a drive system.

19. The ground maintenance vehicle of claim 12 further comprising a platform configured to support an operator.

20. An articulating and caster system for use with a ground maintenance vehicle, the system comprising:
a single lever steering assembly including a single lever steering control, wherein the single lever steering assembly is configured to couple to a frame of the vehicle;
a multi-axis articulating joint configured to couple to the frame of the vehicle;
wherein the multi-axis articulating joint allows for movement along a longitudinal axis and along a vertical axis;
a front caster steering assembly coupled to the multi-axis articulating joint; and
wherein the front caster steering assembly and the multi-axis articulating joint simultaneously provide articulating and caster steering proportional to lateral movement from the single lever steering control.

* * * * *